United States Patent [19]

Johansson et al.

[11] Patent Number: 4,700,798

[45] Date of Patent: Oct. 20, 1987

[54] DRIVER TRAINING APPARATUS FOR SIMULATING SKID CONDITIONS OF AN AUTOMOBILE

[76] Inventors: Alf I. Johansson, Hulte Endre, S-62177 Visby; Bengt R. Rosendahl, Humlegårdsvägen 14, S-62146 Visby, both of Sweden

[21] Appl. No.: 641,951

[22] PCT Filed: Jan. 13, 1984

[86] PCT No.: PCT/SE84/00006

§ 371 Date: Aug. 14, 1984

§ 102(e) Date: Aug. 14, 1984

[87] PCT Pub. No.: WO84/02689

PCT Pub. Date: Jul. 19, 1984

[30] Foreign Application Priority Data

Jan. 14, 1983 [SE] Sweden ................................ 8300173

[51] Int. Cl.⁴ .......................... B62D 61/12; B60S 9/02; G09B 9/04
[52] U.S. Cl. .................................... 180/209; 180/198; 254/2 R; 254/8 C; 280/43.23; 280/79.1 A; 280/761; 434/67
[58] Field of Search ...................... 180/209, 22, 24.01, 180/24.02, 24.03, 24.04, 199, 198, 201; 280/760, 761, 43.18, 43.23, 43.13, 704, 414.5, 414 R; 16/18 R; 254/8 C, 2 R, 2 C, 2 B; 414/529; 434/62, 67, 66

[56] References Cited

U.S. PATENT DOCUMENTS

| 1,074,753 | 10/1913 | Smouse | 254/2 R |
| 1,224,574 | 5/1917 | Sessions | 254/2 R X |
| 1,230,251 | 6/1917 | Whalley | 254/2 C |
| 1,554,630 | 9/1925 | Harrington | 280/19 |
| 1,661,641 | 3/1928 | Vecchi | 280/767 X |
| 1,850,969 | 3/1932 | Russell et al. | 254/2 C X |
| 2,974,972 | 3/1961 | Hassell | 280/43.23 |
| 3,091,476 | 5/1963 | Blake | 280/43.13 |
| 3,410,569 | 11/1968 | Blake | 280/43.23 |
| 3,782,688 | 1/1974 | Scott | 254/2 R |
| 3,817,401 | 6/1974 | Becker | 254/2 R X |
| 3,840,210 | 10/1974 | Hollingsworth | 280/43.23 X |

Primary Examiner—David M. Mitchell
Assistant Examiner—Mitchell J. Hill
Attorney, Agent, or Firm—Young & Thompson

[57] ABSTRACT

A driver training apparatus for simulating skid conditions of an automobile, comprises a separate lifting frame carried by four castor wheels which is disposed under the car and is propelled by the car. Under ordinary driving conditions, the castor wheels turn to follow the movements of the car directed by the driver. Under control of an instructor, however, the frame can raise one or more of the car wheels relative to the ground, to simulate a predetermined skid condition. This can be done either by providing members carried by the frame that are vertically movable relative to the frame, or by raising and lowering the castor wheels relative to the frame.

4 Claims, 13 Drawing Figures

DRIVER TRAINING APPARATUS FOR SIMULATING SKID CONDITIONS OF AN AUTOMOBILE

The present invention relates to an apparatus for enabling regulatable alteration of the friction grip between the wheels of a car and a substructure such as a road.

The invention is primarily intended for passenger cars and has the object of enabling driving training using simple means in such a way that the driver obtains experience of the kind of skids which can occur with the car on a slippery road.

To enable such driving training, driving areas have been used up to now which have been coated with a liquid friction-reducing material. A disadvantage with this is that it is necessary to build special training courses which can only be used for driving training with cars or other motor vehicles.

The need of training car drivers to drive on slippery roads is very great, however, but due to the high costs of building special training courses it has been found impossible to meet this need in practice with a sufficient number of training courses spread out in a geographically suitable manner.

This problem can now be solved in a simple and relatively cheap way by means of an apparatus in accordance with the invention, In an embodiment of the invention, it consists of a rectangular frame carried by four castor wheels. On the frame there is a forward pair of vertically adjustable support means, engaging against the lower link arms or a corresponding place on the car in question. Furthermore the frame also carries a pair of rear, vertically adjustable support means suitably engaging against the rear, shock-absorber attachments of the car. In the neutral or bottom position of the support means, the frame is propelled by the car and rolls freely on the castor wheels, the car wheels thereby bearing against the driving surface with full contact pressure. In order to simulate driving on a slippery surface, it is now possible with the apparatus in accordance with the invention to actuate operating means so that either the forward or the rear support means, or usually all four support means, are adjusted vertically until the car wheels have been unloaded to the desired degree, the castor wheels taking up the weight of the car to a corresponding extent. This results in that the frictional grip of the car wheels against the driving surface decreases to a corresponding degree, or ceases entirely. The basic idea behind the invention is thus to enable with simple means the imitation of conditions prevailing on a more or less slippery driving surface on a dry driving surface. It is thus possible to train winter driving on any kind of hard driving surface, whether this is a road temporarily closed-off for the purpose, or a larger area with a flat surface such as an empty parking lot.

It is suitable that one or both of the castor wheels, at least in one wheel pair, is actuable with a steering means such that these wheels can be steered to one side or the other with the aid of operating means for starting a skid if so desired, particularly at low speeds.

Suitable embodiments of the apparatus according to the invention are schematically illustrated in the accompanying drawings.

Figure 6:
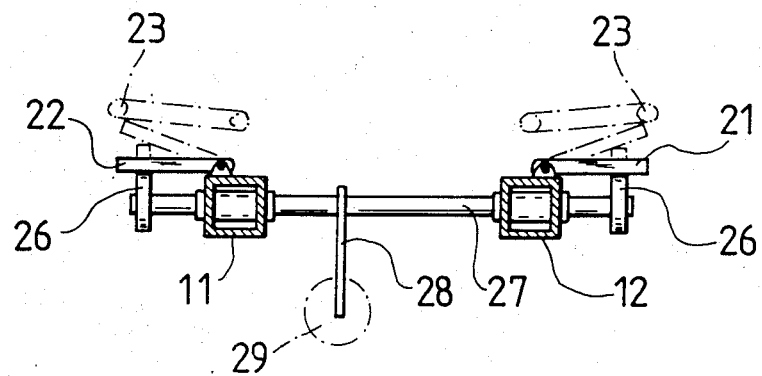
Figure 7:
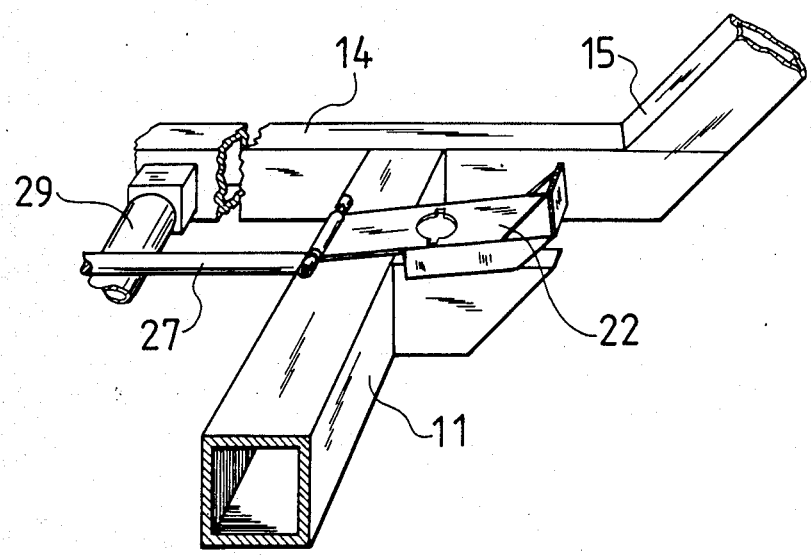
Figure 8:
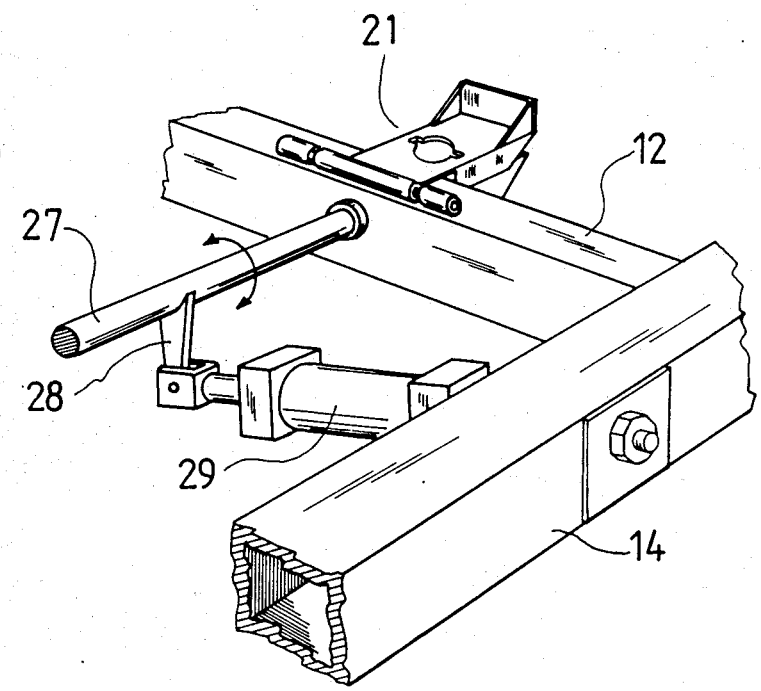
Figure 9:
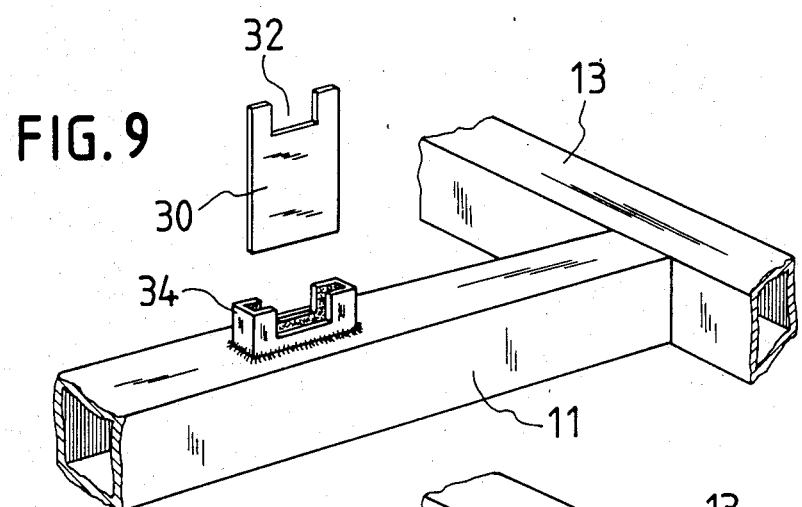
Figure 10:
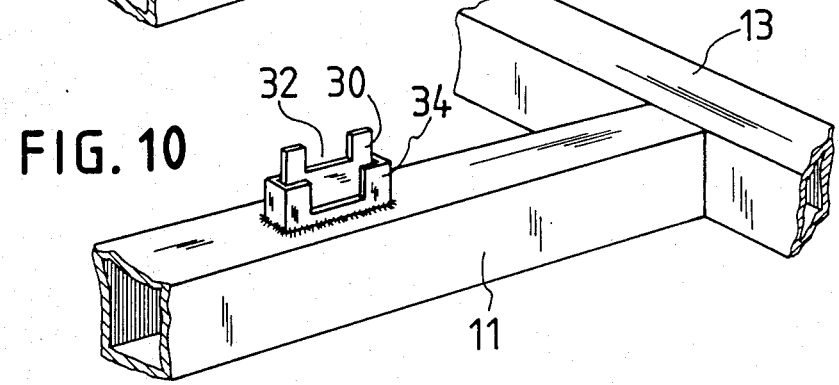
Figure 11:
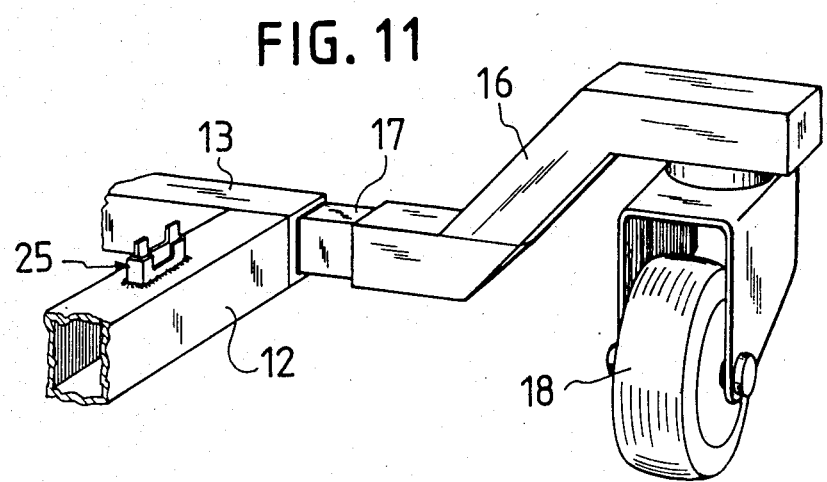
Figure 12:
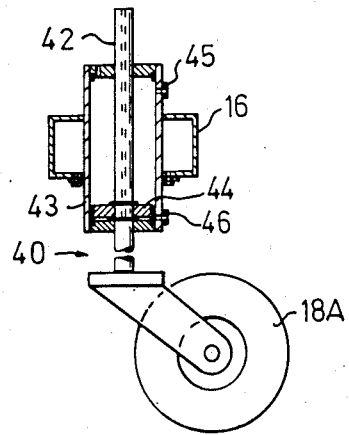
Figure 13:
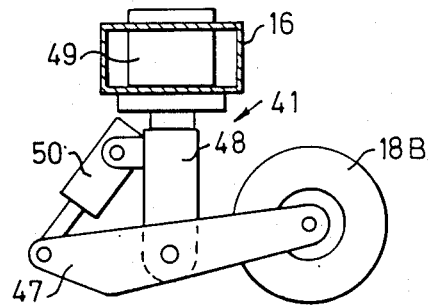

FIG. 6 schematically illustrates the vertically movable forward supports in the form of pivotable lifters, FIG. 7 illustrates one of the forward supports in a partially raised position, FIG. 8 illustrates this support in a downward position, FIG. 9 illustrates the lifting plate of one of the rear supports in a free position above its location means in the beam for facilitating the understanding of the implementation of the plate, FIG. 10 illustrates the lifting plate of the rear support mounted in its location means, FIG. 11 illustrates one rear castor wheel mounted on an arm which is removable from the frame, FIG. 12 illustrates one of four vertically adjustable castor wheels in a modified embodiment, and FIG. 13 shows a modification of such a vertically adjustable castor wheel.

Figure 1:
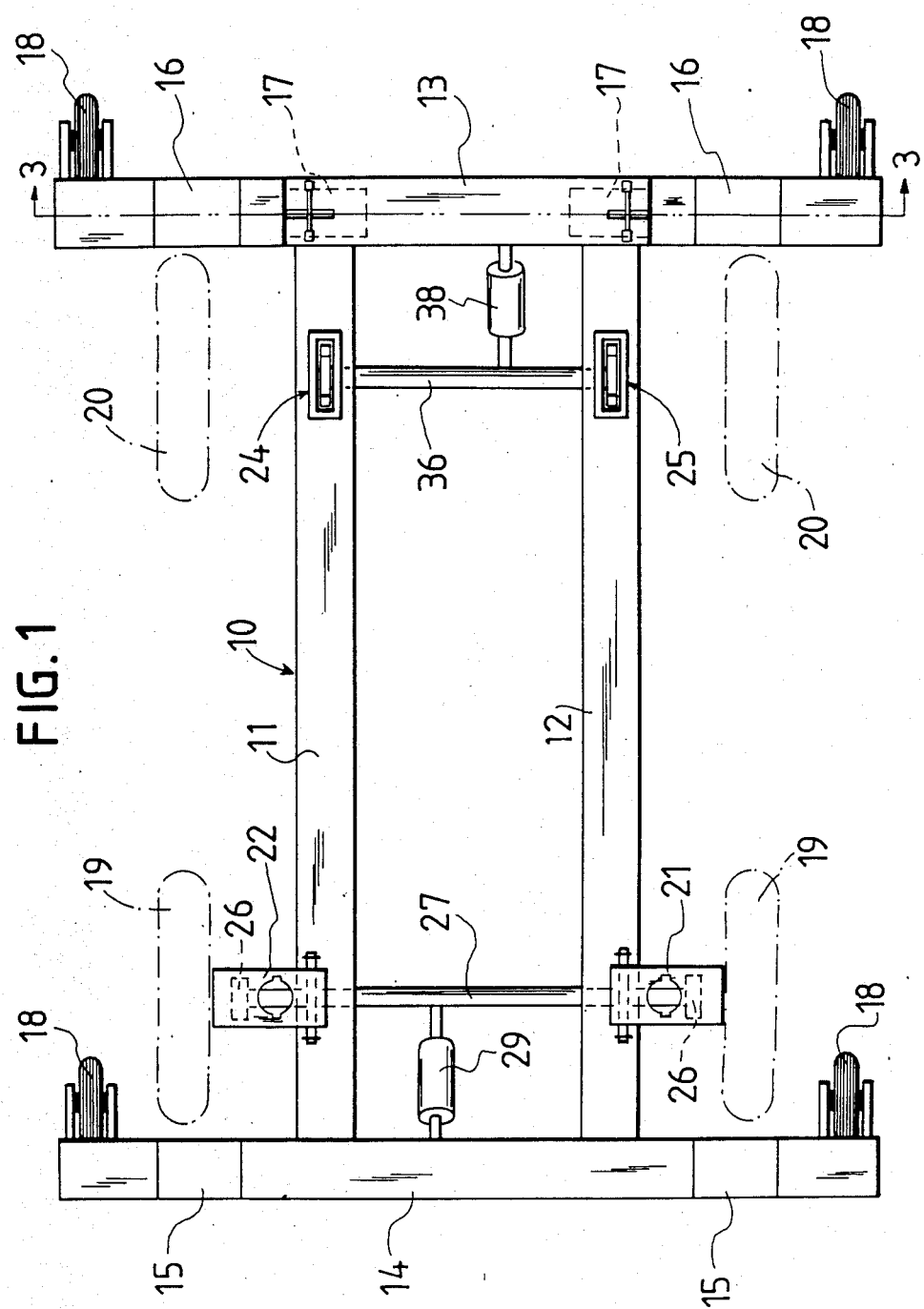
FIG. 1 is a view from above of the apparatus in accordance with the invention.
Figure 2:
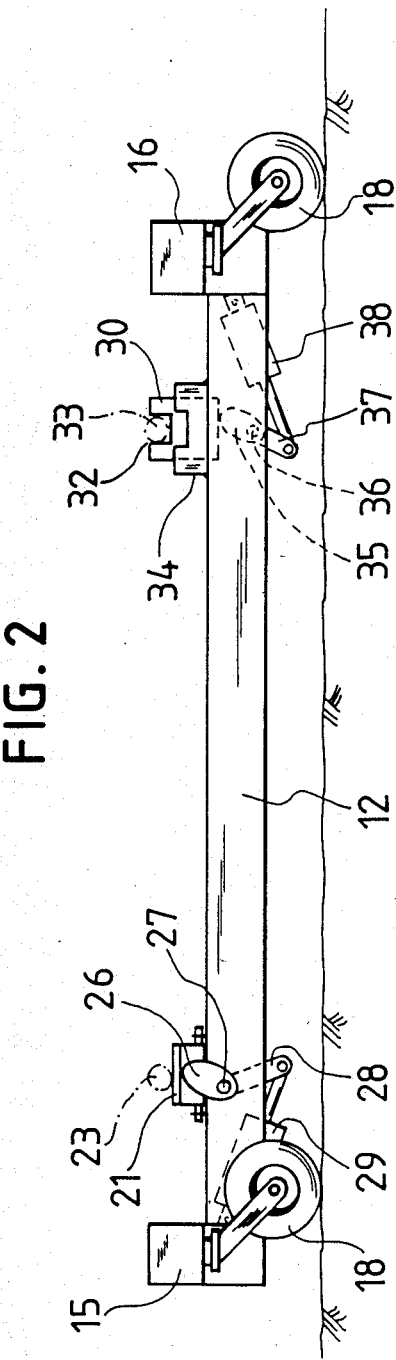
FIG. 2 is a schematic side view.
Figure 5:
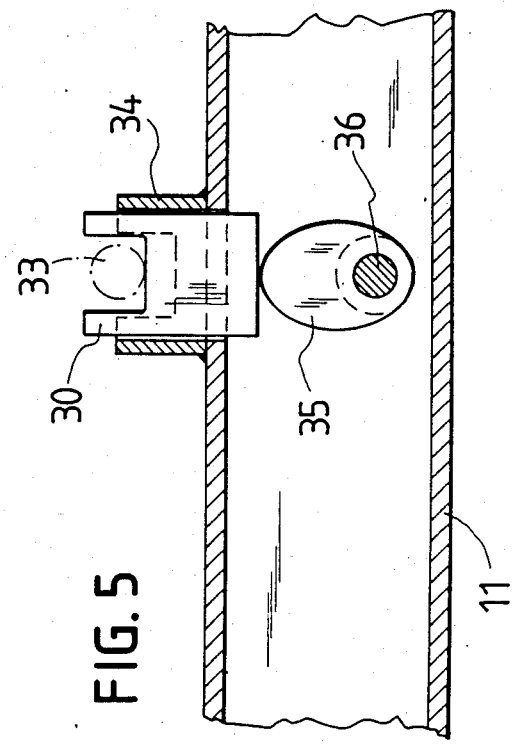
FIG. 5 is a detail section through one of the vertically movable rear supports.
Figure 3:
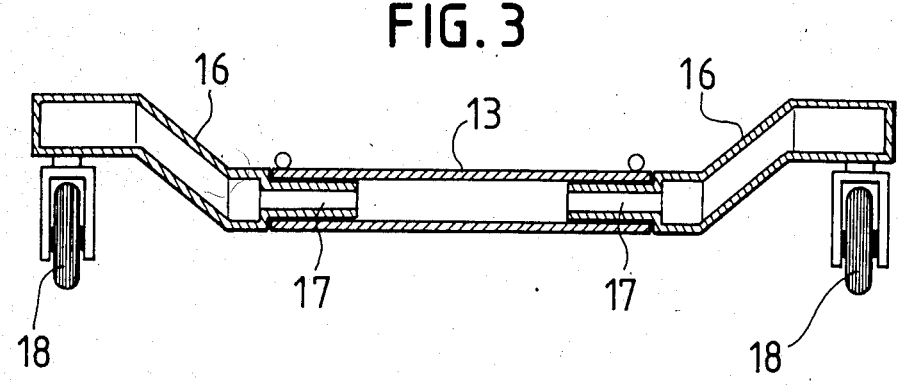
FIG. 3 is a section along the line 3—3 in FIG. 1.
Figure 4:
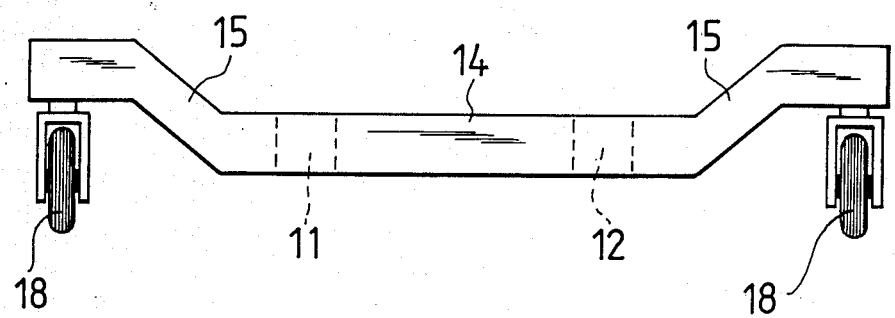
FIG. 4 is a view seen from the front of the forward cross beam.

The frame 10 in FIG. 1 comprises two longitudinal beams 11,12 and two cross beams 13,14, the latter beams being extended at their ends with angled side arms 15,15 and 16,16. The forward side arms are rigidly connected to the cross beam 14, while the rear angular arms 16 are provided with plug ends 17 for thrusting into the cross beam 13, in which they are removably fixed.

Castor wheels 18 are arranged at the outer ends of all the side arms.

The car which is to be placed above the frame 10 carried by the castor wheels has its front wheels 19 and its rear wheels 20 indicated with chain-dotted lines.

The frame is provided with a pair of movable forward support means or supports 21,22 which are adjustable to different heights for bearing against, in this case, the lower link arms 23 of the car front suspension. There are also a pair of movable rear support means or supports 24,25 which are also adjustable to different heights, and in this case they are adapted for bearing against the rear shock-absorber attachments 33 of the car.

The forward supports comprise pivotably mounted lifters, each actuable by a cam 26 attached to a transverse shaft 27 pivotably mounted in the longitudinal beams, an arm 28 being rigidly attached to the shaft 27 and actuable for rotation with the aid of an operating means in the form of a hydraulic cylinder 29.

The rear supports consist of a lift plate 30 with a recess 32 in its upper edge for engaging against the respective rear shock-absorber attachment 33. The plate is located in a location means 34 fixed to the respective beam 11,12. The lower end of the plate rests on a cam 35 rigidly attached to the respective end of a pivotably mounted shaft 36. An arm 37 rigidly attached to the shaft 36 is pivotable with the aid of an operating means in the form of a hydraulic cylinder 38 so that the plates 30 and the rear supports may be raised with the aid of the hydraulic cylinder.

In order to use the frame in accordance with the invention, the rear arms 16 are removed and the car is driven over the frame with the car wheels 19,20 in the position illustrated in FIG. 1. The rear end of the frame is then lifted up again with the aid of a crowbar for example, and the rear arms 16 with their castor wheels 18 are mounted in the positions shown in FIG. 1.

The forward supports 21,22 are now caused to bear relatively lightly against the link arms 23.

The rear supports 24,25 are also caused to bear relatively lightly against the shock-absorber attachments 33, the recessed upper ends of the plates 30 forming a coupling to the shock-absorber attachments so that the frame is propelled by the car.

In a manner known per se, the hydraulic cylinders 29 and 38 are connected to a hydraulic motor with the aid of lines and a valve housing, the motor being driven by an electric motor connected to a car battery. The valve housing can have adjusting means which are manually operable when an instructor sits by the side of the pupil/driver. The adjusting means are also suitably actuable by radio signals with the aid of conventional apparatus, so that the instructor can follow behind the pupil in another car and from there control the frictional engagement in the pupil's car, i.e. shift the load more or less onto the castor wheels so that the contact pressure of the car wheels against the driving surface is reduced to a corresponding extent.

In the illustrated example, the front supports are actuable by a common hydraulic cylinder 29, and in the same way the forward rear supports are actuable by a common hydraulic cylinder 38. However, the different supports 21,22,24,25 may be individually actuable, each by its own operating means such as a hydraulic cylinder.

Within the scope of the invention it is possible also to provide the intended result by means of an apparatus where the castor wheels are raisable and lowerable relative the frame and are controlled by the operating means, the car chassis resting directly on fixed points on the frame via the lower link arms and the shock-absorber attachments.

In a preferred embodiment all four castor wheels are of the type shown in FIG. 12, whereas the forward support means 21, 22 and rear support means 24,25 are not vertically movable but rigidly connected to the frame 10 and shaped to engage the chassis of the car when the frame 10 is raised by means of the vertically adjustable castor wheels 40 in FIG. 12 or 41 in FIG. 13.

FIG. 12 illustrates a castor wheel 18A rotatable by means of a vertical shaft 42 journalled in the ends of a hydraulic cylinder 43 and carrying a piston 44 which may be moved to any desired position within the cylinder 43. Oil may be supplied or withdrawn in a conventional manner for double acting hydraulic cylinders. An upper pipe connection 45 and a lower pipe connection 46 is provided for hydraulic pipes.

The cylinder passes through the angular arm 16 and is secured thereto. All four angular arms have such a castor wheel and cylinder with piston.

The wheels 18A may be individually pressed against the ground, or in pair, or all four wheels 18A may be vertically pressed down to a position between an upper position and the bottom position shown. By pressing down the castor wheels the frame 10 will simultaneously be lifted, so that the car wheels will gradually decrease their friction grip with the ground. Since this embodiment has rigid forward and rear support means engaging the chassis of the car, this embodiment may be easier to be adjusted for use with various types of cars.

The castor wheel 41 has a wheel 18B on a pivotable arm 47 supported by a vertical shaft 48 rotatably journalled in a bearing house 49 secured to the arm 16. The arm 47 is pivoted by means of a hydraulic cylinder 50 to raise and lower the wheel 18B to any desired position thereby lifting the frame 10 for obtaining any desired degree of reduced grip of the car wheels with the ground.

We claim:

1. An apparatus for enabling regulatable alteration of the frictional grip between the wheels of a car and a substructure such as a road, comprising a separate lifting frame (10) carried by four castor wheels (18, 18A, 18B) and a plurality of supporting means (21, 22, 24, 25) for bearing against predetermined places (23, 33) on the underside of the car chassis in question after placing the frame under the car, the mutual spacing between the castor wheels being such that after placing the frame under the car, the castor wheels are each in the area around a car wheel (19), and selectively controlled operating means (29, 38, 43, 44, 47, 50) on the frame for exerting any selected one of a plurality of different lifting pressures on the car relative the substructure such that at least one of the car wheels has a contact pressure against the substructure reduced to a corresponding one of a plurality of different reduced contact pressures, thereby to simulate driving on a more or less slippery driving surface.

2. An apparatus as claimed in claim 1, in which the support means (21,11,24,25) coacting with the car chassis are vertically movable relative the frame and are controlled by the operating means.

3. An apparatus as claimed in claim 1, in which the castor wheels (18A,18B) are raisable and lowerable relative the frame and are controlled by the operating means.

4. An apparatus as claimed in claim 1, in which the frame (10) is provided at its ends with laterally projecting side arms (15,16) carrying the castor wheels, and in which at least one pair of side arms (16,16), is removably (17) connected to the frame.

* * * * *